United States Patent [19]

Ericson et al.

[11] Patent Number: 5,162,142
[45] Date of Patent: Nov. 10, 1992

[54] ELECTRICAL SPLICE SEALANT PAD

[75] Inventors: Robert B. Ericson, Austin; John S. Young, Leander, both of Tex.

[73] Assignee: Minnesota Mining and Manufacturing Company, St. Paul, Minn.

[21] Appl. No.: 595,547

[22] Filed: Oct. 11, 1990

[51] Int. Cl.⁵ .............................................. B32B 3/08
[52] U.S. Cl. .................................. 428/77; 428/78; 428/192; 428/194; 428/215; 428/220; 428/343; 428/354
[58] Field of Search ............... 428/343, 354, 40, 77, 428/78, 192, 194, 215, 220

[56] References Cited

U.S. PATENT DOCUMENTS

| | | | |
|---|---|---|---|
| 2,429,258 | 10/1947 | Boyle | 428/40 |
| 2,975,091 | 3/1961 | Tobey | 428/78 |
| 4,356,222 | 10/1982 | Harakawa | 428/78 |
| 4,512,833 | 4/1985 | Kridl | 428/77 |
| 4,778,703 | 10/1988 | Fontanilla | 428/40 |
| 4,863,535 | 9/1989 | More | 428/68 |

Primary Examiner—Jenna L. Davis
Attorney, Agent, or Firm—Gary L. Griswold; Walter N. Kirn; John C. Barnes

[57] ABSTRACT

An improved sealant pad comprises a rectangular field of viscous sealant supported by a tough flexible film substrate. The substrate and sealant field may have the same dimensions of length and width but generally the substrate will extend beyond the sealant field on at least two opposing sides. One or more of these extending borders of substrate may be advantageously coated with adhesive thereby providing sealant pads with up to four extending flaps of adhesive coated substrate surrounding the sealant field. The sealant pads may be produced in a variety of configurations and are useful for environmentally sealing electrical connections such as are found in wiring harnesses.

4 Claims, 2 Drawing Sheets

ELECTRICAL SPLICE SEALANT PAD

FIELD OF THE INVENTION

The present invention concerns environmental seals for use in making moisture seals for electrical connections such as are found in wire harnesses of all types, and in one aspect to an improved sealant pad construction for making the positioning of the pad easier and containment of the mastic on the pad more positive.

BACKGROUND OF THE INVENTION

Junctions involving electrical wiring harnesses should be sealed or protected against exposure to the elements, particularly moisture: to inhibit corrosion; to reduce the likelihood of electrical shorts; and, to otherwise enhance performance of the electrical system of concern. Generally, such junctions involve at least two, and often a larger number, of insulated wires brought together, and the ends are exposed and joined at a particular junction as by clamping and/or the use of welds or soldering. Numerous seals and seal methods have been developed to protect the junctions; however, none have been completely satisfactory.

An early, convenient and still frequently used method of providing a protective seal around a wire junction is through a wrapping of an electrically insulative adhesive tape around the connection or junction. This method is inexpensive and easy to apply. However, it is not very effective in providing for a good moisture seal.

A relatively recently developed alternative is the use of a sealant pad having a rectangular shape comprising a substrate upon which is positioned a relatively thick pad of a tacky sealant material. This pad is folded about the splice or junction such that the sealant surfaces come in contact. Then the splice and the sealant pad are placed in the center of a compression tool with the seam up and pressure is applied to the pad to further compress the sealant about the junction and the wire ends. U.S. application, Ser. No. 130,541 filed Dec. 9, 1987 and assigned to the assignee of this application discloses a sealant pad as described and the method of making the seal. This application and the disclosure is incorporated herein by reference. The sealant pad illustrated in FIG. 6 of the above identified application has a pad of sealant material positioned asymmetrically on a substrate such that the substrate projects beyond several edges of the pad. One edge provided a flap at a seam and the other two edges provided space to permit expansion of the sealant when pressure was applied.

The sealant as the pad is being deformed and the sealant is forced to flow around the wires and splice, is usually squeezed from the seam and the ends of the folded substrate.

What has been lacking is a way to keep the seam of the sealant pad secure when the junction and the pad are placed in the press.

The present invention reduces this problem and also serves to provide an insulated seal about the junction which has a better appearance.

The present invention provides a sealant pad which has a length of pressure sensitive adhesive tape extending beyond at least one edge of the sealant to maintain a closed seam and restrict sealant from flowing out of a seam as the pad is formed about the junction or splice.

SUMMARY OF THE INVENTION

The moisture sealant pad according to the present invention provides an electrical moisture seal about a splice between a plurality of wires.

In general, the sealant pad comprises a substrate having viscous sealant thereon. The substrate facilitates handling of the viscous sealant, and provides a cover for the sealant and a smooth non-tacky outer surface on the overall seal. A preferred substrate is a rectangular sheet of an all-weather, flexible, non-tacky, tough, polymeric sheet material. A pad of sealant material is positioned on the sheet material in a generally uniform layer and means are provided such that a flap extends beyond an edge of the pad of sealant, which flap has a second tacky or pressure sensitive adhesive surface.

In one embodiment, the sheet of material extends beyond at least two edges of the pad of sealant and, at least one additional edge of the sheet material has means forming a flap which extends beyond the pad of sealant, which flap is preferably formed by a strip of pressure sensitive adhesive tape, applied to the surface of the substrate opposite the pad of sealant and has a longitudinal edge spaced at least half the width of the tape projecting beyond a free edge of the substrate.

Generally, the step of application of the sealant pad involves the placement of the sealant pad about a junction to be sealed, and sealing the extended edge of the adhesive tape to the adjacent edge of the folded pad or to the opposed pressure sensitive adhesive coated surface, if a tape strip is applied to an opposite edge or the folding of the substrate positions pressure sensitive adhesive coated surfaces in opposed relationship. The junction and sealant pad is then placed between a pair of die plates, which plates are brought together under substantial pressure. Preferred sealing is effected through utilization of die plates having opposed semicylindrical surfaces formed of an elastomeric material.

The drawing illustrates several embodiments of the present invention and forms a part of this specification. It will be understood that in some instances relative material thicknesses, and relative component sizes, may be shown exaggerated, to facilitate an understanding of the invention.

BRIEF DESCRIPTION OF THE DRAWINGS

The present invention will be described in greater detail with reference to the accompanying drawing wherein.

DETAIL DESCRIPTION OF THE INVENTION

Figure 1:
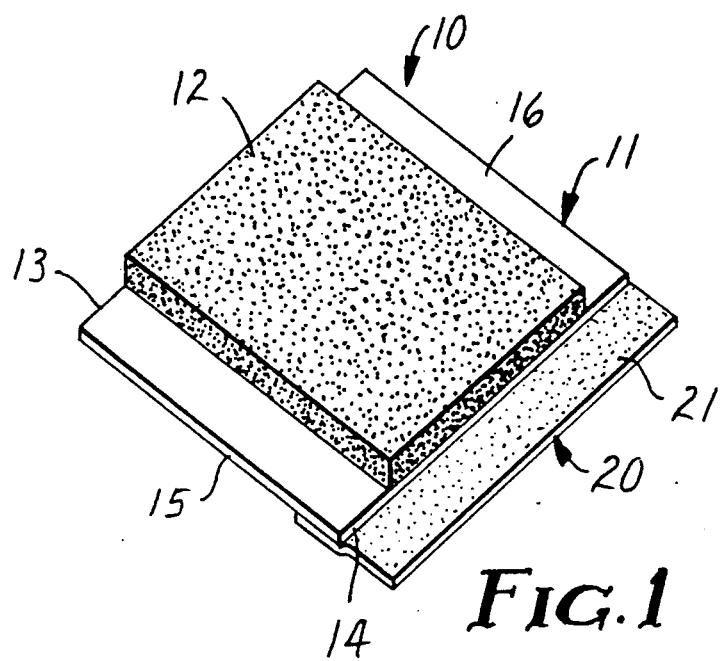
FIG. 1 is a perspective view of a sealant pad according to the present invention.
Figure 2:
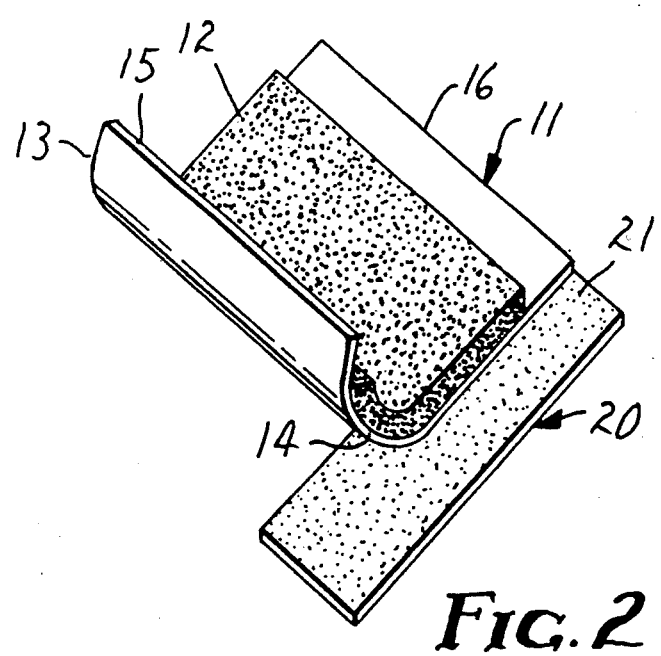
FIG. 2 is a fragmentary, schematic, perspective view showing a sealant pad construction step.

Referring now to the drawing, where like numerals refer to like parts throughout the several views, and particularly to FIGS. 1-4, reference numeral 10 identifies a sealant pad comprising a substrate 11 having a pad 12 of sealant thereon. Generally, substrate 11 is a rectangular sheet of relatively strong flexible material suitable to provide an overall outer covering or jacket for the completed seal. Preferred materials include sheets of tough, all-weather, flexible, non-tacky, vinyl material. A variety of thicknesses of material may be utilized, however, generally vinyl sheets having a thickness of about 4–8 mils (0.004–0.008 inches or about 0.01–0.02 cm) are preferred.

The size of sheet 11 depends, of course, upon the size of the splice to be covered and protected. Generally, for most seals, a pad about 4.0–5.0 cm by 3.0–4.0 cm will be sufficiently large, as many typical automotive or marine electrical junctions are about 1.0–2.0 cm long and about 0.25–0.75 cm wide.

For a presently preferred embodiment, substrate 11 is generally rectangular with opposite longer side edges 13 and 14, and opposite shorter end edges 15 and 16.

Sealant pad 12 comprises an exposed layer or pad of generally uniformly thick, viscous, moisture-resistant, sealant material: which can be readily molded around a junction in a manner adhering thereto; and which, under pressure, exhibits various fluid properties. It will be understood that a variety of such materials may be utilized in pad arrangements 10 according to the present invention. Generally what is required is a sealant of sufficiently high viscosity to be readily plastic to retain a formed shape, for example the rectangular shape shown in FIG. 1, under normal ambient and use conditions. However, under substantial pressure, the sealant material should flow, as described below, sufficiently to be incorporated into the areas between adjacent wires. Further, the material of sealant pad 12 should be sufficiently moldable under ambient conditions to facilitate the forming of the pad about a junction.

A variety of appropriate materials usable as sealant for pads 12 according to the present invention, are already known; however, it is considered within the scope of the present invention to include sealants yet to be developed.

Preferred sealants generally comprise soft, tackified, elastomeric compounds extended with oils and fillers. Typical, useable, elastomeric bases for such compositions include polyisobutylene/EPDM rubber/butyl rubber mixtures. Preferred mixtures have a viscosity of at least about 2,000 poise at a shear rate of 1/600 sec. and a temperature of 75° C.

| Material | Amount, PHR* |
| --- | --- |
| Polyisobutylene | 40.0 |
| EPDM rubber | 28.8 |
| Butyl rubber | 31.2 |
| Polybutene | 100.0 |
| Inorganic filler | 150.0 |
| Asphalt | 30.0 |
| Carbon black | 15.0 |
| Hydrocarbon tackifier | 50.0 |

*PHR = Parts per Hundred Rubber component. The term "Rubber Component" is meant to refer to the total of the polyisobutylene, EPDM rubber and butyl rubber components.

Preferred thicknesses of pad 12 will depend upon: the dimensions of the junction to be sealed; and, the number and size of the wires extending into the junction. Generally thicknesses of about 50–140 mils (0.05–0.140 inches or about 1.27–3.6 mm) will be sufficient for most common junction sizes. Pads which are 0.09 inch (2.3 mm) and 0.125 inch (3.2 mm) thick are common. Preferred sealant pads 12 have a substantially constant cross-sectional area and shape, for ease of preparation and use.

For the embodiment depicted in FIGS. 1 through 4, the sealant pad 12 is oriented on the substrate 11 such that opposite edges 15 and 16 are positioned about ⅛–⅜ inches (0.3–1.0 cm), and preferably about ¼ inch (0.6 cm), beyond the edge of the pad 12 to form a flap for defining an area for the sealant when it is squeezed. Preferably each projecting edge of the substrate is considerably wider than the sealant pad 12 is thick.

It will also be observed, upon examination of FIG. 1, that the sealant pad 10 has a length of pressure sensitive adhesive tape 20 forming an additional flap projecting beyond an edge of the pad 12 and along at least one edge of the substrate 11. This tape has a layer 21 of pressure sensitive adhesive coated on one side, which side is positioned against the surface of the substrate 11 opposite the pad 12 to adhere the tape 20 to the substrate 11. The length or strip of tape 20 projects beyond the edge 14 of the substrate by ¼ to ¾ the width of the tape 20 to define a second sealant portion for the sealant pad 10. The flap formed by the tape 20, during use, is brought against the substrate, adjacent edge 13, to encase or enclose a junction between several wires in the junction when the pad is folded, around the junction, about a line between and parallel to edges 13 and 14.

Figure 3:
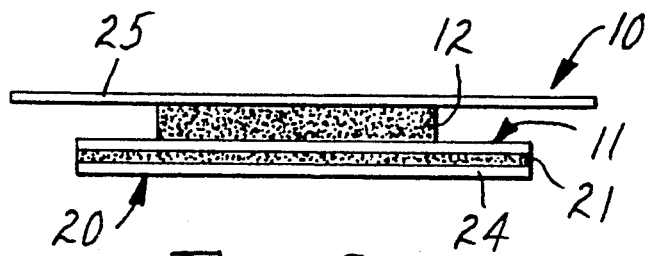
FIG. 3 is a side elevational view of a sealant pad according to the present invention.
Figure 4:
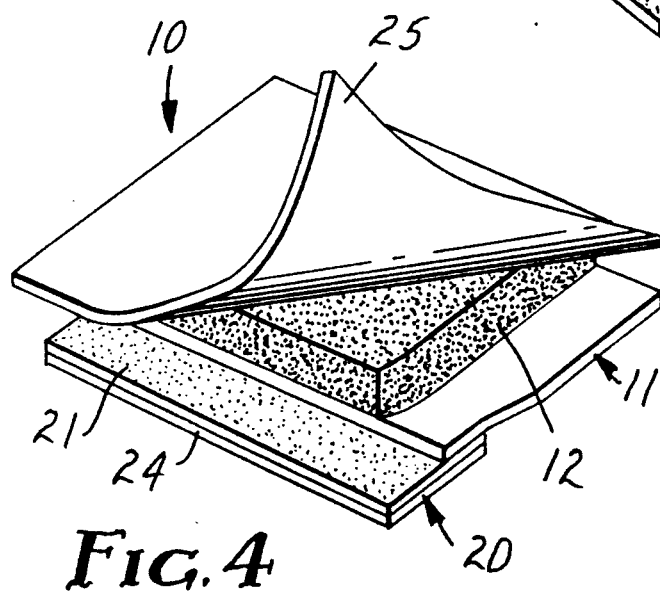
FIG. 4 is a schematic, perspective view of a sealant pad of FIG. 3.

FIGS. 3 and 4 show additional views of the sealant pad 10. In FIG. 3, the edge of the pad 10 is illustrated with the tape 20 having a backing 24 and the layer of adhesive 21 applied thereto. The tape 20 has a tough backing of vinyl and can be colored the same as the substrate 11 or be a different color to afford an easily visible indication as to the thickness of the pad of sealant, or to indicate different types of mastic in the sealant pad, or to indicate which edge is to be folded. The adhesive layer 21 is a pressure sensitive adhesive, preferably a butyl rubber adhesive. The tape is applied to the substrate 11 and a longitudinal edge having a width of between 3 mm (0.125 inch) and 9 mm (0.375 inch) is left exposed along a longitudinal edge of the tape to form a flap. The pad 12 is smaller than the substrate and the pad is generally centrally positioned between the end edges of the substrate, and flaps are formed at each end.

A removable liner 25 is positioned with a low adhesion coating against the pad 12 opposite the substrate to protect the pad 12 until the sealant pad is ready for use. The liner 25 is preferably larger than the dimensions of the pad 12 to permit easy removal, save time and avoid the user from contact with the tacky sealant material.

Figure 5:
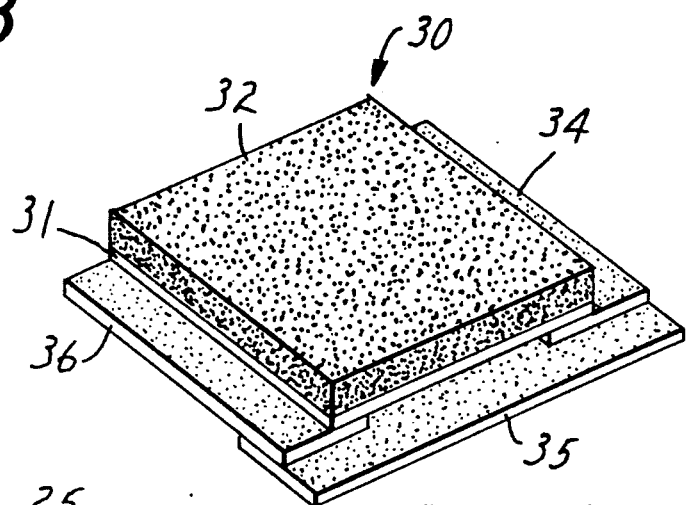
FIG. 5 is a perspective view of a second embodiment of a sealant pad according to the present invention.

FIG. 5 illustrates a second embodiment of a sealant pad 30 constructed according to the present invention wherein a substrate 31 has a pad of sealant 32 disposed thereon and strips of pressure sensitive tape 34, 35 and 36 are attached to the surface of the substrate about three edges thereof. The strips of tape 34, 35, and 36 each have a longitudinally extending marginal edge positioned beyond the edge of the substrate and beyond the edge of the pad to form flaps which can aid in sealing the seam when the pad is folded, i.e., tape 35, and also to form end seals for the pad when tape strips 34 and 36 are folded upon themselves along an axis parallel to the length of tape 35.

Figure 6:
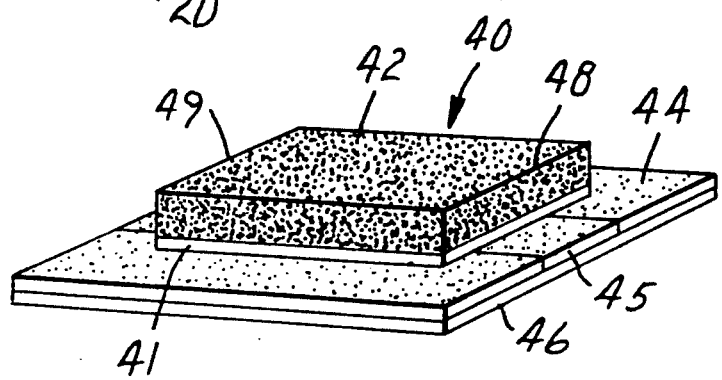
FIG. 6 is a perspective view of a further modification of the sealant pad according to the present invention.

The sealant pad 40 disclosed in FIG. 6 comprises a substrate 41 upon which has been placed a layer of sealant to form a pad 42. The substrate 41 has three pieces of pressure sensitive adhesive tape adhered to the surface of the substrate opposite the surface upon which the pad 42 is placed. The three pieces of tape 44, 45 and 46 extend parallel to each other and each strip has an end portion extending beyond the end edges 48 and 49 of the pad 42 and the strips of tape 44 and 46 have longitudinal portions of the strips extending beyond the side edges of the substrate to form flaps. Thus the sealant pad 40 has flaps extending beyond all four edges of the pad 42 and as formed the flaps are all coated with an adhesive to aid in sealing the edges of the pad after it is placed about a junction. It is possible that a single piece of adhesive coated tape may be substituted for the three lengths of tape illustrated, or substituted for the substrate in that the pad of sealant may be placed directly on the adhesive of the tape, since the tape has a tough vinyl backing like the substrate. However, the present manufacturing of the pads on the substrate makes the form illustrated presently preferred.

The sealant pads 10, 30, and 40 are formed to be folded about a splice or junction of a plurality of wires. The folded pad is then sealed along the seam opposite the fold line by the flap formed by an extended exposed edge of a strip of tape or adhesively coated substrate. The pad and the junction combination is placed in a press with the seam and the fold line positioned to be engaged first by the dies. The press preferably has semi-cylindrically formed, opposed elastomeric die plates and considerable pressure is applied to seam and fold area of the pad. The sealant is allowed to flow into and about the splice and wires to totally seal the junction. The semi-cylindrical die plates aid in causing a separation of the wires such that the interstices between the wires in a cable are apparently coated with the sealant. If the pad is formed according to sealant pad 30 or 40 then the ends of the sealant pad are also closed prior to insertion of the pad in the press. The adhesive on the tape will peel apart as the sealant is forced about the junction and toward the ends of the sealant pad, but the end flaps will serve to restrict the flow from the ends of the pads prior to the sealant flowing first about the junction and the wires. The seal is then removed from the press and the edges again may be resealed affording a smooth neat appearing covered wire junction.

Having disclosed the presently preferred embodiments of the invention it is to be understood that other modifications may be made without departing from the spirit or scope of the present invention as defined by the appended claims.

We claim:

1. A sealant pad for use in providing an environmental seal around an electrical splice between a plurality of wires, said sealant pad comprising:
    (a) a flexible generally rectangular substrate having first and second opposite end edges, and first and second opposite side edges;
    (b) a pad of viscous normally tacky adhesive, at room temperatures, sealant in a substantially continuous layer, 0.05 to 0.14 inch thick, adhered to said flexible substrate and sized to be molded around and engulf a slice to be sealed, said pad of sealant being generally rectangular with at least said first and second end edges of said generally rectangular substrate extending beyond two sides of said pad; and,
    (c) a strip of tape coated with a pressure sensitive adhesive applied to at least one side edge of the substrate, against a surface opposite said pad of sealant, such that a longitudinal portion of said strip of tape extends beyond and along one side edge of said substrate.

2. A sealant pad according to claim 1 wherein said substrate comprises a sheet of non-tacky, all weather vinyl polymeric material.

3. A sealant pad according to claim 1 wherein said sealant comprises soft, tackified, elastomeric compounds including polyisobutylene/EPDM rubber/butyl rubber mixtures.

4. A sealant pad for use in providing an environmental seal around an electrical splice between a plurality of wires, said sealant pad comprising:
    (a) a rectangular piece of flexible, tough, polymeric sheet material having first and second opposite end edges, and first and second opposite side edges; and
    (b) a rectangular pad of viscous sealant in a continuous layer 0.005 inch to 0.14 inch thick adhered to said flexible sheet material and sized to be molded around and engulf a splice to be sealed, said pad being positioned generally centrally of the sheet material, and means defining a plurality of flaps extending beyond the edges of the pad between 0.125 and 0.375 inch, wherein said flaps extending beyond the edges of the pad are coated with a layer of pressure sensitive adhesive,
wherein said means defining said flaps is a plurality of lengths of pressure sensitive adhesive coated tape adhered to a substrate supporting said pad of sealant.

* * * * *